(12) United States Patent
Kalotay (10) Patent No.: US 8,478,670 B2
(45) Date of Patent: Jul. 2, 2013

(54) METHOD AND SYSTEM FOR DETERMINING WHICH MORTGAGE CHOICE IS BEST FOR A CONSUMER

(75) Inventor: Andrew J. Kalotay, New York, NY (US)

(73) Assignee: Andrew Kalotay Associates, Inc., New York, NY (US)

( * ) Notice: Subject to any disclaimer, the term of this patent is extended or adjusted under 35 U.S.C. 154(b) by 359 days.

(21) Appl. No.: 11/510,897

(22) Filed: Aug. 28, 2006

(65) Prior Publication Data

US 2007/0055603 A1   Mar. 8, 2007

Related U.S. Application Data

(60) Provisional application No. 60/712,706, filed on Aug. 30, 2005, provisional application No. 60/785,050, filed on Mar. 22, 2006.

(51) Int. Cl.
*G06Q 40/00* (2012.01)

(52) U.S. Cl.
USPC .............................................. 705/35; 705/38

(58) Field of Classification Search
None
See application file for complete search history.

(56) References Cited

U.S. PATENT DOCUMENTS

| | | | |
|---|---|---|---|
| 4,876,648 A | 10/1989 | Lloyd | |
| 5,878,404 A | 3/1999 | Stout, Jr. et al. | |
| 5,946,668 A | 8/1999 | George | |
| 5,966,700 A | 10/1999 | Gould et al. | |
| 6,269,347 B1 | 7/2001 | Berger | |
| 6,345,262 B1 | 2/2002 | Madden | |
| 6,513,019 B2 | 1/2003 | Lewis | |
| 6,671,677 B2 | 12/2003 | May | |
| 6,788,968 B2 | 9/2004 | Pettibon | |
| 6,839,686 B1 | 1/2005 | Galant | |
| 7,089,503 B1 | 8/2006 | Bloomquist et al. | |
| 2001/0013017 A1 | 8/2001 | Berger | |
| 2002/0019805 A1 | 2/2002 | Kalotay | |
| 2002/0046158 A1 | 4/2002 | Kelly | |
| 2002/0059136 A1 | 5/2002 | May | |
| 2003/0036988 A1 | 2/2003 | James | |
| 2003/0182220 A1 | 9/2003 | Galant | |
| 2004/0059670 A1 | 3/2004 | Mills | |

(Continued)

OTHER PUBLICATIONS

Financial Analysts Journal, A Model for valuing Bonds and Embedded Options by Kalotay, Williams and Fabozzi, May/Jun. 1993.*

(Continued)

*Primary Examiner* — Rajesh Khattar
(74) *Attorney, Agent, or Firm* — Buchanan Ingersoll & Rooney PC (57) ABSTRACT

A method and system for selecting a preferred debt instrument (e.g., mortgage) for an individual consumer, where the option adjusted spreads (OAS) and risk measures of a plurality of debt instruments are determined and ranked using standard bond valuation methodology. A typical scenario involves a consumer inputting a plurality of mortgages and associated features (e.g., term of loan or type of interest rate) and receiving the option adjusted spread and risk measure for each mortgage, from which the consumer may select the appropriate mortgage having the lowest option adjusted spread within his or her risk tolerance. These steps can be implemented by a computer which includes a central processing unit (CPU) and a computer code operatively associated with the CPU. The relative option adjusted spreads and risk measures of various debt instruments can be displayed on a visual display or used to automatically commence the financing of a mortgage.

20 Claims, 4 Drawing Sheets

U.S. PATENT DOCUMENTS

| | | |
|---|---|---|
| 2004/0064402 A1 | 4/2004 | Dreyer et al. |
| 2004/0162734 A1 | 8/2004 | Speece et al. |
| 2004/0167850 A1 | 8/2004 | Dreyer et al. |
| 2005/0216384 A1 | 9/2005 | Partlow et al. |
| 2006/0031159 A1* | 2/2006 | Minot et al. .................... 705/38 |
| 2006/0218080 A1 | 9/2006 | Kalotay et al. |
| 2007/0043640 A1 | 2/2007 | Broms et al. |
| 2007/0067233 A1 | 3/2007 | Dalal |
| 2007/0130041 A1 | 6/2007 | Strela et al. |
| 2007/0136181 A1 | 6/2007 | Miller |
| 2007/0150396 A1 | 6/2007 | Rossen et al. |
| 2007/0219883 A1 | 9/2007 | Bronsnick et al. |
| 2007/0244836 A1 | 10/2007 | Kalotay |
| 2008/0215497 A1 | 9/2008 | Dillon |

OTHER PUBLICATIONS

Mortgages 101-Using Option-Adjusted-Spread Analysis to Extract Prepayment Option Costs from Mortgage Yields, Eric Banfield, Sep. 21, 2004.*
First Look: Excel 2002, John Walkenbach, May 31, 2001.*
What is an Annual Percentage Rate (APR)? archived at Wayback Machine on Feb. 3, 2002.*
Corporate Finance by Ross, Westerfield, Jaffe, pp. 68-70.*
An Option-Theoretic Prepayment Model for Mortgages and Mortgage-Backed Securities by Kalotay, Yang and Fabozzi, International Journal of Theoretical and Applied Finance, vol. 7, No. 8, Dec. 2004.*
The New Breed: Option Adjusted Spreads; Belton, Terrence M., Secondary Mortgage Markets, v5, n4, pp. 6-11 Winter 1988/1989.*
Valuing Cash Flows from Mortgage-Backed Securities; Lauher, Gary; Solberg, Donald; Secondary Mortgage Markets, v8, n1, pp. 22-24, Spring 1991.*
Whistling past the graveyard, Husted, Robert N Jr; Van Valkenburg, Paul T; Mortgage Banking, v55, n8, pp. 93-98, May 1995.*
Bear Stearns enhances prepayment models; Karen Sibayan; Asset Securitization Report, Aug. 1, 2005.*
Fannie Mae at Sanford C. Bernstein & Co. 20th Annual Strategic Decisions Conference 2004—Part 2; Fair Disclosure Wire, Jun. 3, 2004.*
Price of Risk Constant: Going beyond OAS; Lancaster, Brian; Cohler, Gene; Feldman, Mark; Mortgage-Backed Securities Letter, v11 n29 pp. 3-4; Jul. 15, 1996.*
Kalotay et al., "An Option-Theoretic Prepayment Model for Mortgages and Mortgage-backed Securities," Intl'l J. Theorectical & Applied Fin., Dec. 2004, vol. 7, No. 8, World Scientific, New Jersey.
"Mortgage Calculators," http://www.arcloan.com/browse.asp?altfunc=2, accessed Jan. 24, 2005 (2 pages).
"Need Mortgage Management," http://www.arcloan.com, accessed Jan. 24, 2005 (2 pages).
"Online PreQual," http://www.arcmtg.com/id3.html, accessed on Jan. 24, 2005 (4 pages).
"Refinance Calculator", http://www.arcloan.com/refcalculator.asp?altfunc=2&cal=1, access on Jan. 24. 2005 (2 pages).
"Refinancing Using the Automatic Rate Cut Loan," http://www/arcloan.com/browse.asp?func=2, accessed Jan. 24, 2005 (2 pages).
Boyce, W. M., et al., "Tax Differentials and Callable Bonds", The Journal of Finance, vol. 34, pp. 825-838, Sep. 1979.
Flesaker et al., "The Pricing of Firearms ("Falling Interest Rate Adjustable—Rate Mortgages")", Abstract, vol. 6, *J. of Real Estate Fin. & Econ.*, (1993) p. 251, Kluwer Academic Publishers (1 page).
Kalotay, A., "Agency Bonds and the Role of Bermudan Swaptions", The 10$^{th}$ Annual Fixed Income Summit, Dec. 2, 2004, Palm Beach, Florida.
Kalotay, A., et al., "Ratchet Bonds: Maximum Refunding Efficiency at Minimum Transaction Cost", *Journal of Applied Corporate Finance*, Spring 1999, vol. 12, No. 1, pp. 40-47, Bank of America.

* cited by examiner

METHOD AND SYSTEM FOR DETERMINING WHICH MORTGAGE CHOICE IS BEST FOR A CONSUMER

CROSS-REFERENCE TO RELATED PATENT APPLICATIONS

This application claims priority from Provisional Application U.S. Application 60/712,706, filed Aug. 30, 2005, incorporated herein by reference in its entirety. This application claims priority from Provisional Application U.S. Application 60/785,050, filed Mar. 22, 2006, incorporated herein by reference in its entirety.

BACKGROUND OF THE INVENTION

Consumer debt instruments, such as residential mortgages, are offered to homeowners in a range of structures. These vary by term (length of repayment period), interest rate type (fixed or adjustable), amortization of principal, and the number of up-front points paid.

One choice consumers typically have with respect to a consumer debt instrument such as a mortgage is the length of the repayment period or term. Thirty-year and fifteen-year mortgages are typical although ones with shorter and longer terms exist.

Most consumer debt instruments such as residential mortgages currently fall into two categories with respect to interest calculations: fixed-rate mortgages (FRM) and adjustable-rate mortgages (ARM). FRMs carry a fixed interest rate until they are fully amortized, unless they are paid off early because the home has been sold or the FRM is refinanced. ARMs carry an interest rate that adjusts periodically, usually but not necessarily on the anniversary date of the mortgage. In recent years, some home buyers have obtained hybrid mortgages which are a combination of FRMs and ARMs. Such hybrid mortgages continue for a period of time as FRMs and, at a predetermined time, are converted to ARMs on previously agreed terms. The newest trend includes mortgage "portfolios", i.e., a combination of different types of mortgage loans under a single contract.

Additionally, consumers typically have a choice with regard to the amortization of the principal. Most mortgages are set up such that each payment made by the consumer pays off at least some portion of the principal. In recent years, interest-only mortgages have become more popular, particularly with younger home buyers or buyers seeking mortgages for investment properties. With interest-only mortgages, payments made by the consumer for the first several years are not applied to the principal and serve only to pay off the interest.

Yet another decision consumers must make when selecting a debt instrument is whether to pay up-front points in order to obtain a lower nominal interest rate. As an example, Table 1 below displays the terms of thirty-year fixed coupon mortgages offered by a large mortgage lender:

TABLE 1

Selected Mortgage Products Offered by Countrywide Financial on Jun. 8, 2005

| Points | Annual rate (%) | APR (%) |
|---|---|---|
| 0 | 6.000 | 6.047 |
| 0.75 | 5.500 | 5.614 |
| 2.50 | 5.250 | 5.524 |

The indicated annual percentage rate (APR) is the internal rate of return of the resulting cash flows. The APR is based on the condition that the mortgage remains outstanding for its full scheduled life, such as thirty years, and that the transaction cost at origination is 0.5%. In general, the APR includes any origination fees, discount points, and private mortgage insurance that may be part of the loan agreement. It is evident from Table 1 that a homeowner can reduce the APR of borrowing by paying up-front points.

Often times, consumers will rank mortgages and other debt instruments based on the conventional APR. However, conventional APR is not always an accurate indicator of the best mortgage choice, because the APR is based on the condition that the mortgage remains outstanding for the entire term. There are practical considerations that could significantly reduce the life of the loan. For example, the owner may need to relocate and sell the home prior to maturity of the mortgage. Additionally, the homeowner may decide to refinance the mortgage in order to take advantage of declining interest rates.

Presently, consumers have many choices of debt instruments when it comes to financing a home or other large asset. The term of the loan, type of interest rate, type of amortization of principal, number of up-front points paid, and the ability to combine several different mortgage types into a single "portfolio" mortgage creates a substantial number of mortgage structure possibilities. While each individual feature may have its appeal, such as whether to pursue a FRM or ARM, at present there remains no way of determining which combination of these factors will benefit an individual consumer most.

A further shortcoming of conventional APR is that it cannot be calculated for floating rate mortgages.

In addition, the consumer must factor in the risk of a particular mortgage structure (in the form of cash flow uncertainty, for example) when making a choice. Just as it is possible to earn high returns on investments with high risk, it is possible to pay low mortgage rates initially in a ARM, by taking on higher cash flow risk than for a FRM of comparable term.

Accordingly, there is a need for a more accurate indicator than conventional APR for determining which choice of consumer debt instrument is the most attractive based on the term, calculation of interest rate, amortization of the principal, the number of up-front points paid, and the risk tolerance of the consumer.

SUMMARY OF THE INVENTION

In accordance with one aspect of the present invention, a preferred consumer debt instrument or portfolio of consumer debt instruments having the lowest option adjusted spread (OAS) is selected from a plurality of consumer debt instruments consistent with a consumer's borrowing horizon. The preferred consumer debt instrument is selected by first determining the OAS of each of the plurality of consumer debt instruments based on a yield curve, then determining the risk (by calculating the duration, for example) of each of the plurality of consumer debt instruments, and then collecting the OAS's for each risk level or risk range, of each of the plurality of consumer debt instruments to determine which is the most attractive to the borrower given the borrower's level of risk tolerance. In ranking the plurality of consumer debt instruments, for a particular risk level or risk range, the preferred consumer debt instrument outranks another consumer debt instrument if its option adjusted spread is lower.

In accordance with another aspect of the present invention, a system for selecting a preferred consumer debt instrument having the lowest option adjusted spread for a particular level of risk from a plurality of consumer debt instruments, the system includes a central processing unit (CPU) and a computer code operatively associated with the CPU. The computer code has a first set of instructions configured to determine the option adjusted spread of each of the plurality of consumer debt instruments based on a yield curve, a second set of instructions configured to determine the risk of each of the plurality of consumer debt instruments, and a third set of instructions configured to rank the plurality of consumer debt instruments according to the option adjusted spread for particular levels of risk to determine which is the most attractive to the borrower. In ranking the plurality of consumer debt instruments, the computer selects the preferred consumer debt instrument over another consumer debt instrument if the option adjusted APR of the preferred consumer debt instrument is lower, for the consumer's preferred level of risk.

In accordance with a yet another aspect of the present invention, if a consumer has decided a priori that he or she wants to choose from only FRMs of the same term, the preferred consumer debt instrument having the lowest option adjusted annual percentage rate (APR) is selected from a plurality of fixed rate consumer debt instruments consistent with the consumer's borrowing horizon and having the same term. The preferred consumer debt instrument is selected by first determining the option adjusted spread of each of the plurality of consumer debt instruments based on a yield curve. In order to appeal to consumers who think in terms of APR, the option adjusted APR may be calculated of each of the plurality of consumer debt instruments, which may then be ranked according to the option adjusted APR to determine which is the most attractive to the borrower. In ranking the plurality of consumer debt instruments, the preferred consumer debt instrument outranks another consumer debt instrument if its option adjusted APR is lower.

In accordance with still another aspect of the present invention, a system for selecting a preferred consumer debt instrument having the lowest option adjusted APR from a plurality of fixed rate consumer debt instruments, the system includes a central processing unit (CPU) and a computer code operatively associated with the CPU. The computer code has a first set of instructions configured to determine the option adjusted spread of each of the plurality of consumer debt instruments based on a yield curve, a second set of instructions configured to determine the option adjusted APR of each of the plurality of consumer debt instruments, and a third set of instructions configured to rank the plurality of consumer debt instruments according to the option adjusted APR to determine which is the most attractive to the borrower. In ranking the plurality of consumer debt instruments, the computer selects the preferred consumer debt instrument over another consumer debt instrument if the option adjusted APR of the preferred consumer debt instrument is lower.

DETAILED DESCRIPTION OF THE INVENTION

The present invention is directed towards an option-based method for identifying the consumer debt instrument, such as a residential mortgage, including those mortgages which combine several mortgage structures under one contract, with the lowest option adjusted spread (OAS) based on the term of the loan, calculation of interest rates, amortization of the principal, and number of up-front points paid, and the risk tolerance of the borrower.

The present invention is based on the relationship between the cost of a consumer debt instrument and the actual life, as measured by the APR, of the instrument. It has been found that the shorter the life of the loan, the higher the APR. This effect is particularly prominent when the number of points paid up-front is large. Yet, this relationship is not always true when the life of the consumer debt instrument is uncertain.

The APR values in Table 1 above are based on the assumption that the mortgages will live their full scheduled lives of thirty years. Because a homeowner may move or refinance prior to maturity of a mortgage, the actual life of a mortgage may be much shorter than the scheduled life.

Figure 1:
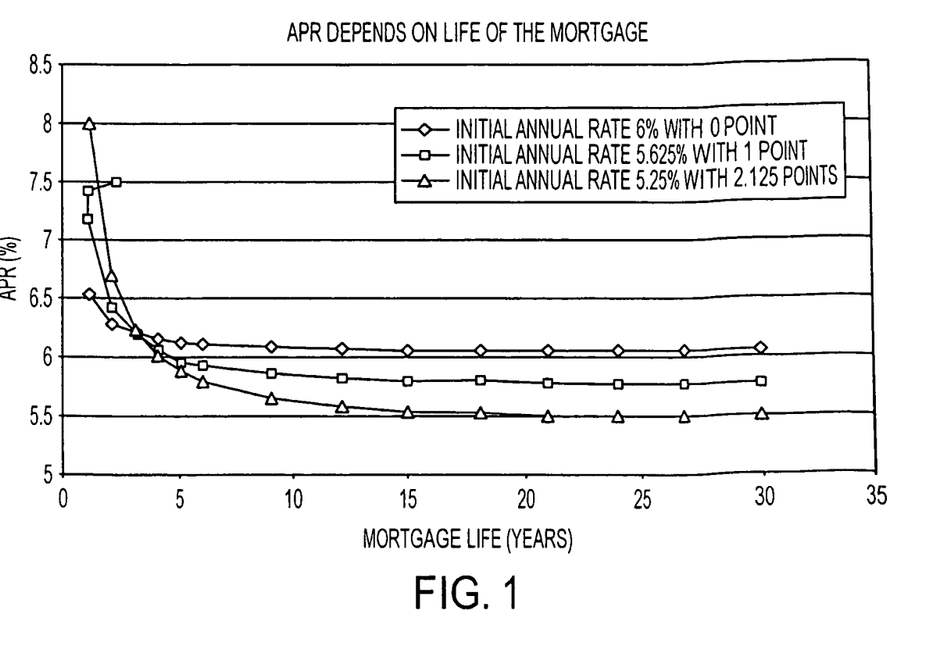
FIG. 1 is a plot of the annual percentage rate (APR) versus the mortgage life for three different mortgages.

FIG. 1 displays how the APRs of the three mortgages depend on their actual lives. As is evident from FIG. 1, the greater the up-front discount points, the more sensitive the APR is to the actual life. As shown in FIG. 1, the par (no points) mortgage and the one point or 1% discount mortgage intersect in the third year, so the 1% discount mortgage is preferable only if mortgage it is expected to remain outstanding for at least three years. Similarly the par and the 2.125 point or 2.125% discount mortgage intersect shortly after the third year, and the 1% discount mortgage and 2.125% discount mortgage also cross paths between years three and four. In summary, the par mortgage is preferable only if the actual life turns out to be less than three years. If the mortgage life is four years or longer, then the choice is the 2.125% discount mortgage.

Based on FIG. 1, it is evident that a critical factor in selecting a consumer debt instrument such as a mortgage is the expected time of its prepayment. The expected time depends on many unpredictable factors, particularly the course of interest rates. The complicating consideration is that a conventional mortgage can be refinanced at any time, and if interest rates have sufficiently declined the homeowner is likely to take advantage of this opportunity. Therefore, the possibility of refinancing, which depends entirely on the course of interest rates, must be considered when choosing a mortgage.

In order to compare the relative attractiveness of the loans, standard bond valuation methodology is used. Specifically, the option adjusted spread (OAS) of each consumer debt instrument is calculated relative to a benchmark yield curve, at a reasonable interest rate volatility. For fixed rate mortgages with the same term, the option adjusted spread may be used to calculate the present value of the scheduled cash flows of the consumer debt instrument, which in turn is used to determine its option adjusted APR, for ease of consumer comprehension. It would be most beneficial for the homeowner to choose the debt instrument with the lowest option adjusted spread (OAS) or, equivalently, if the consumer is interested only in fixed rate debt instruments with the same term, the lowest option adjusted APR.

For purposes of analysis, the consumer debt instrument is modeled as a callable amortizing bond, or a portfolio of callable bonds as needed, that pays interest monthly. As mortgages are essentially callable amortized bonds, the principles regarding the refunding of bonds provide a good basis from which the optimal mortgage can be determined. In bond theory, a call or redemption option enables the borrowing corporation to buy back the bond at a stated price prior to maturity, thereby allowing the borrower to replace the bonds with a lower-cost issue should interest rates fall. This is often referred to as "refunding." Applying these principles to mortgages, the call premium is the cost associated with refinancing a mortgage. In this example, the call premium is set at 1% of the remaining principal.

Figure 2:
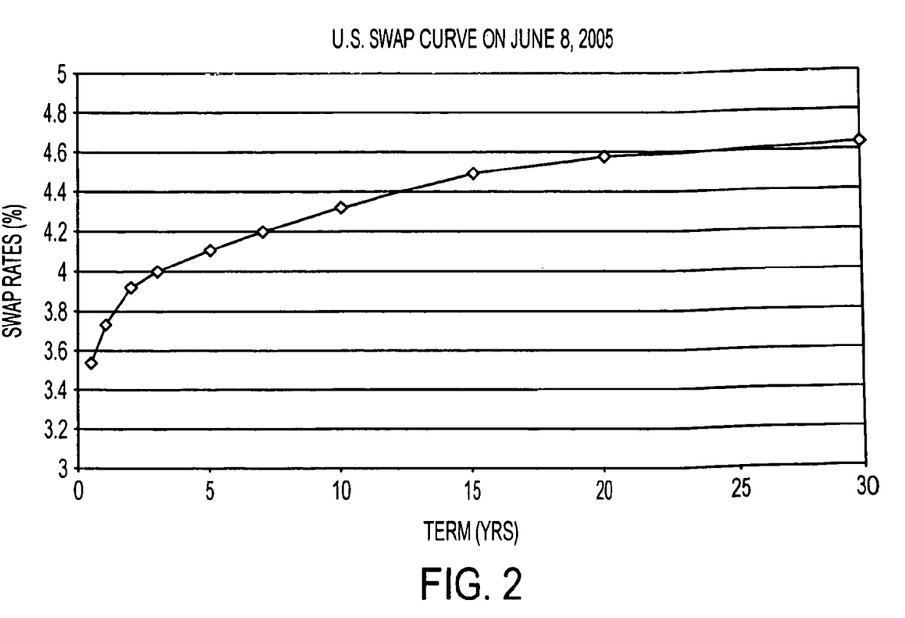
FIG. 2 is a standard swap curve showing the swap rate for different terms.
Figure 3:
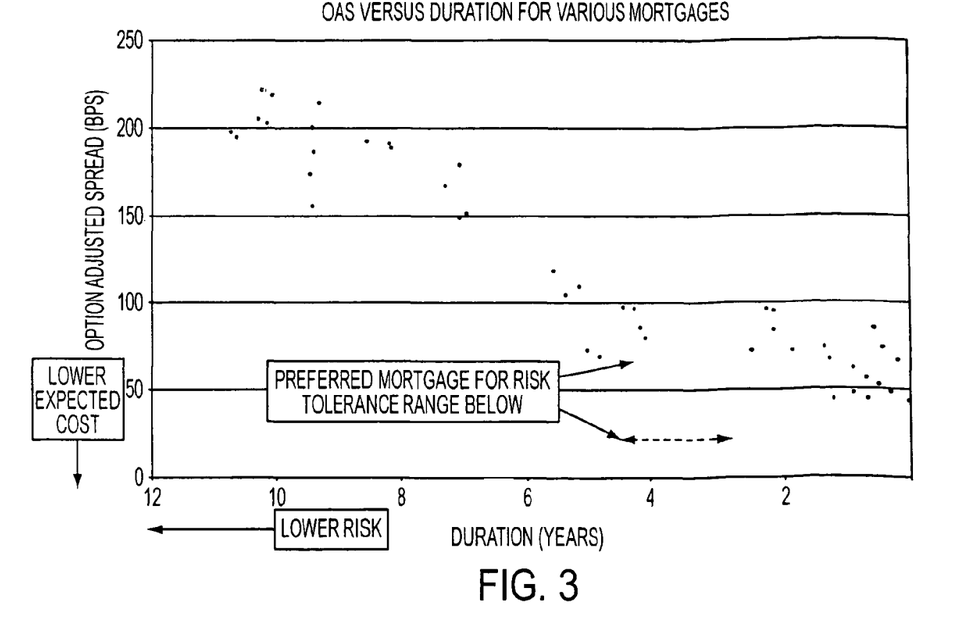
FIG. 3 is a plot of the option adjusted spreads versus the duration (a risk measure) for hypothetical mortgage offerings.

The OAS is calculated relative to a benchmark yield curve. A yield curve is defined as: "[a] graph showing the term structure of interest rates by plotting the yields of all bonds of the same quality with maturities ranging from the shortest to the longest available." See DICTIONARY OF FINANCE AND INVESTMENT TERMS 797 (John Downes & Jordan Elliot Goodman eds., Barron's 6th ed., 2003). One example of a benchmark yield curve is the Treasury yield curve. A Treasury curve reflects the borrowing rates for various maturities. Another example of a benchmark yield curve is a standard swap curve, such as the swap curve shown in FIG. 2. The swap curve is available from services such as Reuters-Telerate. The swap curve is currently preferred; however, any reasonable benchmark yield curve may be used. In this example, a standard swap curve, such as that provided in FIG. 2, is used.

To model the evolution of interest rates, the standard Black-Karasinski process is employed with a reasonable volatility. Volatility is defined as "[the] characteristic of a security, commodity, or market to rise or fall sharply in price within a short-term period." See DICTIONARY OF FINANCE AND INVESTMENT TERMS 776 (John Downes & Jordan Elliot Goodman eds., Barron's 6th ed., 2003). The volatility in question is that of the short-term rate. In this example, the volatility is set at a short-term rate of 15%. The 15% volatility is in line with the implied volatilities of agency debentures of similar duration.

Since the tax treatment of discount points and interest rates can have a significant impact on the value of a debt instrument to a consumer, the analysis can be performed on an after-tax basis as well.

The present invention may be employed through a method which takes into consideration data related to the consumer debt instruments, data related to the consumer, and data related to the interest rate environment, as described below.

The first group of input for consideration is data related to the consumer debt instruments. This includes terms such as the maturity, interest rate, amortization, discount points. Also included are the up-front costs and anticipated up-front costs in future refinancing, which are needed to determine when the debt instrument should be refinanced if rates decline.

The second group of input for consideration is data related to consumer, such as the consumer's borrowing horizon. The consumer's borrowing horizon may be deterministic, such as a fixed length of time, i.e., eighteen years. Alternatively, the consumer's horizon may be probabilistic, such as a PSA speed. Additionally, the consumer's tax rate should be considered.

The third group of input for consideration is data specifying the interest rate environment. This includes the current yield curve, such as the Treasury curve or a standard swap curve. Additionally, the interest rate volatility must be considered.

Given the inputs described above, the method of the present invention comprises the following steps. First, the OAS of each consumer debt instrument is determined. This takes into account the possibility of refinancing in the future to save interest in the event rates decline. The highest OAS (or the individual OAS determined for each consumer debt instrument) is then used to determine the present value (PV) of the stated cash flows, which in turn is used to calculate the option adjusted APR. Then, the various consumer debt instruments are ranked according to their option adjusted APRS. For convenience, the debt instruments are ranked from lowest to highest. The debt instrument with the lowest option adjusted APR is the most preferable.

The method of the present invention may be computer implemented. For example, the method may be implemented by a computerized system, the system including a computer having a central processing unit (CPU). The computer also has computer code operatively associated with the CPU, the computer code having a plurality of instructions for carrying out the method of the present invention. For instance, the computer code may have a first set of instructions for carrying out the first step of the method, and a second step of instructions for carrying out the second step of the method, and so forth. The CPU reads the instructions stored on the computer code and processes the instructions in order to carry out the individual steps of the method. In this manner, the computerized system implements the method of the present invention.

DETAILED DESCRIPTION OF THE PREFERRED EMBODIMENTS

The present invention will now be described more fully with reference to the Figures in which the preferred embodiment of the present invention is shown. The subject matter of this disclosure may, however, be embodied in many different forms and should not be construed as being limited to the embodiment set forth herein.

As an example, a home buyer who does not expect to move for thirty years or longer seeks a thirty-year mortgage for $100,000. A lender offers the following three choices of thirty-year fixed rate mortgages: (1) 6.00% with zero points; (2) 5.50% with 0.75 points; and (3) 5.25% with 2.50 points. If points are included in the quote, the loan amount must be increased in order to have $100,000 left over after the points are deducted. The analysis assumes that the borrower will incur transaction costs of one percent of the principal if the loan is refinanced in the future.

Using the OAS techniques described previously, the borrower can compare the relative attractiveness of these three mortgages. The inputs include a benchmark yield curve such as a Treasury yield curve or a standard swap curve, such as the swap curve shown in FIG. 2. For this example, a Treasury yield curve is used. Additionally, the interest rate volatility also is required. For this example, the interest rate volatility is set at 15%. Table 2 shows the inputs for this example:

TABLE 2

| Treasury Yield Curve (Volatility 15%) | | | | | |
|---|---|---|---|---|---|
| Term | | | | | |
| 6 mo | 2 yr | 3 yr | 5 yr | 10 yr | 30 yr |
| Yield (%) 3.66 | 4.00 | 4.06 | 4.11 | 4.27 | 4.48 |

Figure 4:
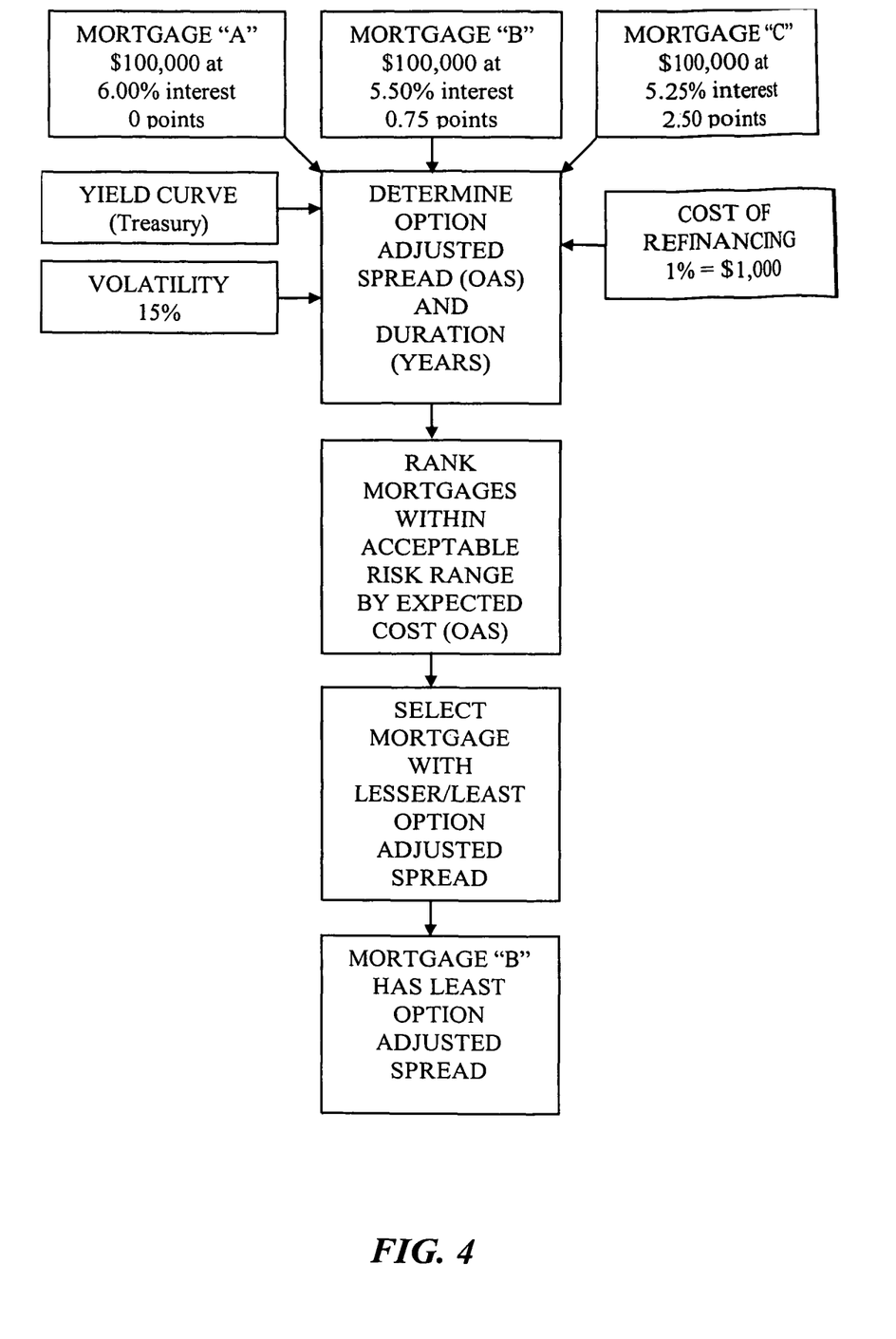
FIG. 4 is a flow chart of the method of the present invention.

As outlined in FIG. 4, the method of the present invention processes the inputs described above and determines which mortgage choice is best for a consumer in terms of the lowest option adjusted spread for the consumer's given risk tolerance.

First, the OAS of each mortgage is determined. This takes into account the possibility of refinancing in the future to save interest in the event rates decline. Here, the cost of refinancing is set at one percent of the principal, or $1,000. The highest OAS (or the individual OAS determined for each mortgage) is used to calculate the risk as represented by duration (the larger the duration the lower the risk).

Then, the various mortgages are ranked according to their option adjusted spreads within the risk tolerance range of the consumer. For convenience, the mortgages are ranked from lowest to highest. A first mortgage, Mortgage A, is considered to "dominate" a second mortgage, Mortgage B, if the option adjusted spread of Mortgage A is lower than that of Mortgage B. In this example, assuming that the risk of all three mortgages is within the risk tolerance range of the consumer, the 5.50% mortgage with 0.75 points dominates the 5.25% mortgage with 2.50 points and the 6.00% mortgage with zero points as both of those have lower option adjusted spreads.

Finally, every mortgage which is dominated by another mortgage is eliminated from further consideration. The consumer can choose the one that remains as the most beneficial.

The 5.50% mortgage with 0.75 points has an option adjusted spread that is lower, at 40.5 basis points, than the other two mortgage choices. The results shown in Table 3 below indicate that the second choice, the 5.50% mortgage with 0.75 points, is the most attractive. For ease of comprehension, the largest OAS can be used to calculate the present value of the cash flows of each mortgage which in turn may be used to calculate its option adjusted APR. As Table 3 indicates, option adjusted APR of the 5.50% mortgage is the lowest even though its conventional APR is not.

TABLE 3

Second Option Is Best Based On OAS Approach

| Rate (%) | Points (%) | Option Adjusted Spread (bps) | Risk (Duration in years) | Conventional APR (%) | Option-Adjusted APR (%) |
|---|---|---|---|---|---|
| 6.00 | 0.00 | 76.6 | 4.66 | 6.047 | 5.247 |
| 5.50 | 0.75 | 40.5 | 6.63 | 5.614 | 5.100 |
| 5.25 | 2.50 | 49.6 | 7.49 | 5.524 | 5.113 |

Many changes and modifications will occur to those skilled in the art upon studying this description. All such changes and modifications which are within the spirit of the invention are intended to be included within the scope of the claims.

What is claimed is:

1. A computer-based method for selecting a debt instrument for a borrower from a plurality of consumer debt instruments, said plurality of debt instruments having respective scheduled lives, costs, risk levels, annual percentage rates (APR) and option-adjusted spreads (OAS), said method comprising:
   selecting, by the computer, debt instruments from the plurality of debt instruments, said selected debt instruments having risk levels that correspond to a risk-tolerance of the borrower, wherein said risk-tolerance of the borrower is a range of durations received from the borrower that are within the scheduled lives of the debt instruments;
   determining, by the computer, present values of cash flows of the selected debt instruments based on the respective option-adjusted spreads, wherein the present values include the values of the borrower's option to prepay the selected debt instruments before the respective ends of the scheduled lives of said debt instruments;
   determining, by the computer, option-adjusted annual percentage rates (option-adjusted APR) for the selected debt instruments based on the respective present values of the cash flows, including the values of the borrower's option to prepay the selected debt instruments, which values are determined by the OAS's of the selected debt instruments;
   selecting, from the selected debt instruments, a debt instrument having the lowest option-adjusted APR for a duration within the range of durations received from the borrower; and
   outputting, from the computer, a report identifying the debt instrument selected for the borrower,
   wherein the risk-tolerance of the borrower corresponds to a predetermined period of time in which the borrower will repay the debt instruments.

2. The method of claim 1, wherein the risk levels of said debt instruments are determined based on the respective scheduled lives of the instruments.

3. The method of claim 1, wherein said computer selects the consumer debt instrument with the lowest option adjusted spread.

4. The method of claim 1, wherein said computer selects the consumer debt instrument with the lowest after-tax option adjusted spread.

5. The method of claim 1, wherein said computer selects the consumer debt instrument with the lowest after-tax option adjusted annual percentage rate.

6. The method of claim 1, wherein said option-adjusted spread is based on a Treasury curve.

7. The method of claim 1, wherein said option-adjusted spread is based on a swap curve.

8. The method of claim 1, wherein said consumer debt instrument is a mortgage.

9. The method of claim 8, wherein said mortgage is a fixed rate mortgage.

10. The method of claim 9, wherein said mortgage is an adjustable rate mortgage.

11. A computer-based system for selecting a debt instrument for a borrower from a plurality of consumer debt instruments, said plurality of debt instruments having respective scheduled lives, costs, risk levels, annual percentage rates (APR) and option-adjusted spreads (OAS), said system comprising:
   a processor; and
   a data storage device including computer-readable instructions that, when executed by the processor control the computer to:
   select debt instruments from the plurality of debt instruments, said selected debt instruments having risk levels that correspond to a risk-tolerance of the borrower, wherein said risk-tolerance of the borrower is a range of durations received from the borrower that are within the scheduled lives of the debt instruments;
   determine present values of cash flows of the selected debt instruments based on the respective option-adjusted spreads, wherein the present values include the values of the borrower's option to prepay the selected debt instruments before the respective ends of the scheduled lives of said debt instruments;
   determine, by the computer, option-adjusted annual percentage rates (option-adjusted APR) for the selected debt instruments based on the respective present values of the cash flows, including the values of the borrower's option to prepay the selected debt instruments, which values are determined by the OAS's of the selected debt instruments;

select, from the selected debt instruments, a debt instrument having the lowest option-adjusted APR for a duration within the range of durations received from the borrower; and output a report identifying the selected debt instrument selected for the borrower, wherein the risk-tolerance of the borrower corresponds to a predetermined period of time in which the borrower will repay the debt instruments.

12. The system of claim 11, wherein the risk levels of said debt instruments are determined based on the respective scheduled lives of the instruments.

13. The system of claim 11, wherein said computer is configured to select the consumer debt instrument with the lowest option adjusted spread.

14. The system of claim 11, wherein said computer is configured to select the consumer debt instrument with the lowest after-tax option adjusted spread.

15. The system of claim 11, wherein said computer is configured to select the consumer debt instrument with the lowest after-tax option adjusted annual percentage rate.

16. The system of claim 11, wherein said option-adjusted spread is based on a Treasury curve.

17. The system of claim 11, wherein said option-adjusted spread is based on a swap curve.

18. The system of claim 11, wherein said consumer debt instrument is a mortgage.

19. The system of claim 18, wherein said mortgage is a fixed rate mortgage.

20. The system of claim 18, wherein said mortgage is an adjustable rate mortgage.

* * * * *